C. GREIG.
LUMBER BINDER.
APPLICATION FILED MAR. 26, 1915.

1,198,910.  Patented Sept. 19, 1916.

Witnesses
Fenton S. Belt
J. W. Sherwood

Inventor
Charles Greig
By Franklin H. Hough
Attorney

UNITED STATES PATENT OFFICE.

CHARLES GREIG, OF IRON RIVER, MICHIGAN.

LUMBER-BINDER.

1,198,910.     Specification of Letters Patent.     Patented Sept. 19, 1916.

Application filed March 26, 1915. Serial No. 17,248.

*To all whom it may concern:*

Be it known that I, CHARLES GREIG, a citizen of the United States, residing at Iron River, in the county of Iron and State of Michigan, have invented certain new and useful Improvements in Lumber-Binders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for binding lumber together upon vehicles and consists of a simple and efficient device of this nature, having various details of construction, combinations and arrangements of parts which will be hereinafter fully described, shown in the accompanying drawings and then specifically defined in the appended claim.

Figure 1:
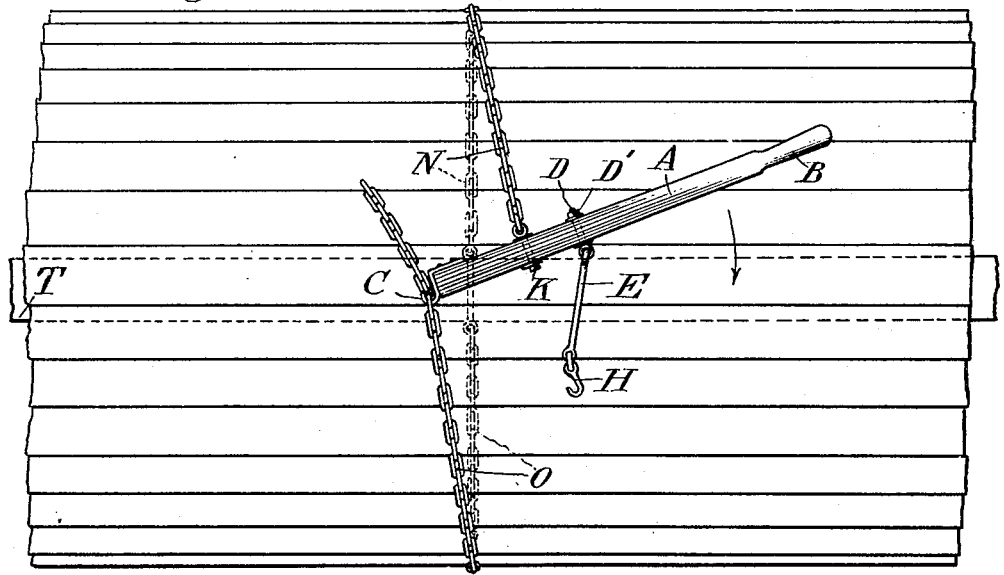
Figure 2:
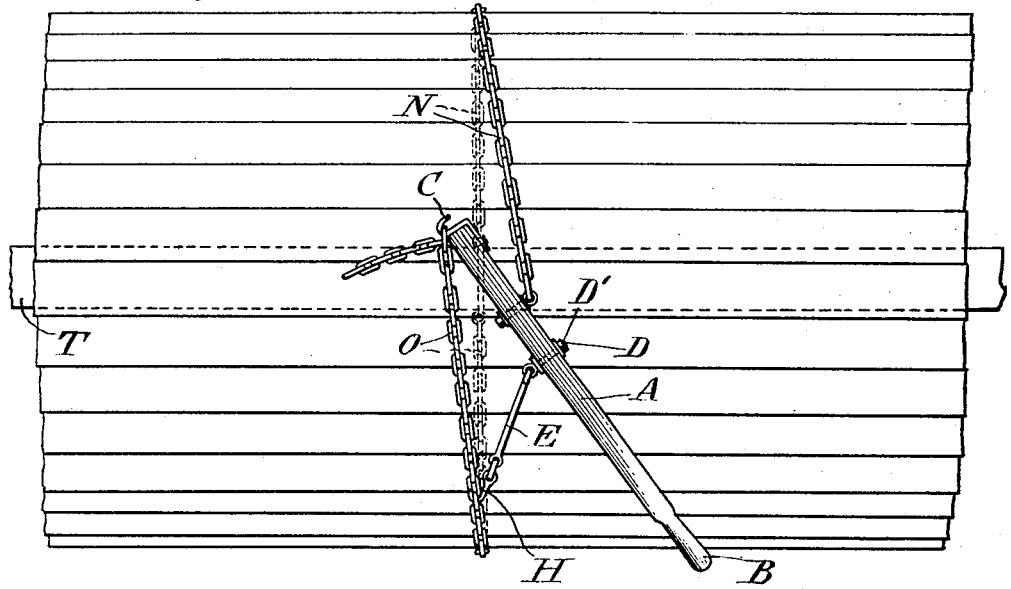

My invention is illustrated in the accompanying drawings, in which:

Figure 1 is a side elevation showing the application of my invention and Fig. 2 is a sectional view showing the manner of attaching the chains to the reach of the vehicle.

Reference now being had to the details of the drawings by letter, A designates a lever having a handle end B, and C designates a hook having an angled shank portion fastened to one end of the lever in the manner shown. An eye bolt, designated by letter D, passes through the lever at any suitable location, preferably near its center, and has a nut D' upon one end. A rod E is fastened to the eye of said bolt, said rod also having a link at its end which engages a grab hook H. A second eye bolt, designated by letter K, is fastened to the lever intermediate the bolt D and the hook C, and chains N and O are fastened to the reach T and one chain passed over the top of the pile of lumber and the other underneath. The end of one chain N is connected to the eye of the bolt K and the other to the hook $C^a$ and the grab hook is fastened to a link of the chain which is connected to the hook $C^a$, after the lever is swung from the position shown in Fig. 1 to that shown in Fig. 2, thus causing the chains to securely bind and hold the lumber together, the lever being held in its binding position in any suitable manner. A reverse movement of the lever will release the chains, as will be readily understood.

What I claim to be new is:—

The herein described device for binding lumber, comprising a lever with a handle portion, a hook independent of the lever and affixed to one end of said lever and having a bearing against the end and side thereof, an eye bolt passed through said lever adjacent its midlength, a rod pivotally mounted in said eye bolt and having a link at its free end to engage a grab hook, a second eye bolt passed through said lever between the first-named bolt and the hook, a chain connected to the last-named I bolt upon the side of the lever opposite the connection of said rod, said chain adapted to engage the material to be bound, and a second chain connected with the first-named chain and adapted to extend in the opposite direction and engage the material to be bound, said last-named chain engageable with said hook and adapted to be engaged by the grab hook carried by said rod.

In testimony whereof I hereunto affix my signature in presence of two witnesses.

CHARLES GREIG.

Witnesses:
ROY GARTLAND,
M. COUNIHAN.

Copies of this patent may be obtained for five cents each, by addressing the "Commissioner of Patents, Washington, D. C."